United States Patent [19] [11] 4,258,469

Salvesen [45] Mar. 31, 1981

[54] APPARATUS AND METHOD FOR INSTALLING ELECTRICAL CONNECTORS

[76] Inventor: William R. Salvesen, 577 77th St., Brooklyn, N.Y. 11209

[21] Appl. No.: 73,783

[22] Filed: Sep. 10, 1979

[51] Int. Cl.[3] ........................ H01R 43/00; B23P 23/00

[52] U.S. Cl. ........................................ 29/884; 29/564.6; 29/749; 29/876

[58] Field of Search ................. 29/749, 750, 747, 884, 29/876, 741, 753, 564.6

[56] References Cited

U.S. PATENT DOCUMENTS

| | | | |
|---|---|---|---|
| 3,835,445 | 9/1974 | Hardesty | 29/876 |
| 3,839,787 | 10/1974 | Brown et al. | 29/884 |
| 3,860,316 | 1/1975 | Hardesty | 339/91 R |
| 3,954,320 | 5/1976 | Hardesty | 339/99 R |
| 4,178,675 | 12/1979 | Phillips | 29/753 X |

*Primary Examiner*—Lowell A. Larson
*Assistant Examiner*—C. J. Arbes
*Attorney, Agent, or Firm*—Samuelson & Jacob

[57] ABSTRACT

In apparatus and method for installing a multi-contact electrical connector at the terminus of a multi-conductor cable, a plurality of electrical contacts are inserted in a dielectric body member of the connector with the installed adjacent contacts spaced apart a relatively short, accurately determined distance and the installation method and means provide for the insertion of the contacts sequentially, in interlaced groups of simultaneously inserted contacts, thereby enabling the adjacent simultaneously inserted contacts of each sequential group to be spaced apart a distance greater than the limited given distance during installation while maintaining the accuracy of the relatively short given distance between adjacent installed contacts.

30 Claims, 17 Drawing Figures

APPARATUS AND METHOD FOR INSTALLING ELECTRICAL CONNECTORS

The present invention relates generally to assembly apparatus and method and pertains, more specifically, to apparatus and method for installing a multi-contact electrical connector at the terminus of a multi-conductor cable.

In recent years, telephones, as well as other corded electrical appliances and products, have become "modular" in that the electrical cables, or cords, used in connection with such devices are selectively disconnectable in order to enable the user to choose a cord of desired color, style or length. The cords themselves are multi-conductor cables and the selective connection and disconnection of the cables is attained through the use of a multi-contact electrical connector located at each end of the cable. Ordinarily, these cords are lightweight cables having conductors of small gage and the connectors are small, precision elements in which a plurality of contacts are located in relatively close proximity to one another and are each connected to a conductor in the cable. Installation of a connector at a terminal end of the cable usually entails placement of the conductors into the body member of the connector element and insertion of the contacts into the body member and into electrical connection with the corresponding conductors. The close proximity of the contacts to one another, together with the requirement for precision dictated by the relatively small connector, gives rise to the need for apparatus and procedures which assure accuracy in the location and insertion of the contacts. Moreover, the high volume demand for cords with these connectors requires that the installation of the connectors be accomplished rapidly and with minimal operator effort.

It is therefore an object of the present invention to provide apparatus and method for the rapid and precision installation of a multi-contact electrical connector at the terminus of a multi-conductor electrical cable through sequential operations in which a group of electrical contacts is inserted within the body member of the connector in one operation and at least one further contact is inserted in a further operation in interlaced arrangement with the group so that the spacing obtaned between the inserted contacts is an accurately determined relatively short given distance less than the distance between adjacent contacts in the group.

Another object of the invention is to provide apparatus and method of the type described and in which the contacts are supplied in the form of contact strips of indeterminate length and are cut from the contact strips just prior to insertion at an insertion station so as to facilitate the supply of contacts to the insertion station.

Still another object of the invention is to provide apparatus and method of the type described and in which the connector body member is positively located at an insertion station for the insertion of a first group of contacts spaced apart a distance greater than the desired spacing between the contacts of a completely installed connector and is subsequently located positively at a further insertion station for the insertion of a further group of contacts which are interlaced with the first group of contacts so that the distance between the adjacent installed contacts is less than the distance between the contacts of a single group and is accurately determined.

Yet another object of the invention is to provide apparatus and method of the type described and in which the electrical connectors ae installed accurately and with minimal effort on the part of an operator.

A further object of the invention is to provide apparatus and method of the type described and in which electrical connectors are installed with reliability and in large numbers with minimal time and effort.

A still further object of the invention is to provide apparatus of the type described and which can be constructed economically and will provide reliable service over an extended service life.

The above objects, as well as still further objects and advantages, are attained by the present invention which may be described briefly as apparatus for installing a multi-contact electrical connector element at the terminus of an electrical cable having a plurality of insulated conductors, the connector element including a dielectric body member carrying a plurality of electrical contacts arranged generally side-by-side and spaced laterally a given distance from one another, in accordance with the spacing between the conductors of the cable, with each contact secured within a slot in the body member and connected to a corresponding conductor, the apparatus comprising: a frame; a nest member for receiving and holding the body member in position to receive the conductors of the cable at laterally spaced positions corresponding to the side-by-side arrangement of the contacts; locating means for locating the nest member at a predetermined insertion station along the frame; supply means for supplying a group of the contacts to the predetermined insertion station, the contacts being in the form of a contact strips of indeterminate length, one strip for each contact in the group, each strip including a series of consecutive contacts integral with one another along the length of the strip; feed means for advancing the strips along feed paths of travel from the supply means toward the predetermined insertion station to juxtapose a groups of contacts with the nest member at the station which the contacts of the group spaced apart laterally from one another a distance greater than the given distance; cutting means at the predetermined insertion station in position for receiving the group of contacts, while the contacts remain integral with the strips, the cutting means being movable laterally relative to the strips to sever the group of contacts from the strips and move the severed contacts into alignment with the positions of the corresponding slots in the body member; insertion means at the predetermined insertion station for moving the severed contacts along insertion paths of travel toward the nest member and into a corresponding slot in the body member to secure the contacts in the body member and make an electrical connection between each contact and a corresponding conductor; and further means for installing at least one further contact interlaced with the group of inserted contacts such that the spacing between the further contact and an adjacent inserted contact will equal the given distance.

The invention further contemplates a method for installing a multi-contact electrical connector element at the terminus of an electrical cable having a plurality of insulated conductors, the connector element including a dielectric body membe carrying a plurality of electrical contacts arranged generally side-by-side and spaced laterally a given distance from one another, in accordance with the spacing between the conductors of the cable, with each contact secured within a slot in the body member and connected to a corresponding conductor, the method comprising the steps of: receiving and holding the body member within a nest member in position to receive the conductors of the cable at laterally spaced positions corresponding to the side-by-side arrangement of the contacts; locating the nest member at a predetermined insertion station; supplying a group of the contacts to the predetermined insertion station, the contacts being in the form of contact strips of indeterminate length, one strip for each contact in the group, each strip including a series of consecutive contacts integral with one another along the length of the strip; advancing the strips along feed paths of travel from the supply means toward the predetermined insertion station to juxtapose a group of contacts with the body member at the station with the contacts of the group spaced apart laterally from one another a distance greater than the given distance; receiving the group of contacts at the predetermined insertion station, while the contacts remain integral with the strips, severing the group of contacts from the strips and moving the severed contacts into alignment with the positions of the corresponding slots in the body member; moving the severed contacts along insertion paths of travel toward the body member and into a corresponding slot in the body member to secure the contacts in the body member and make an electrical connection between each contact and a corresponding conductor; and installing at least one further contact interlaced with the group of inserted contacts such that the spacing between the further contact and an adjacent inserted contact will equal the given distance.

The invention will be more fully understood, while still further objects and advantages thereof will become apparent, in the following detailed description of a preferred embodiment of the invention illustrated in the accompanying drawings, in which.

Figure 1:
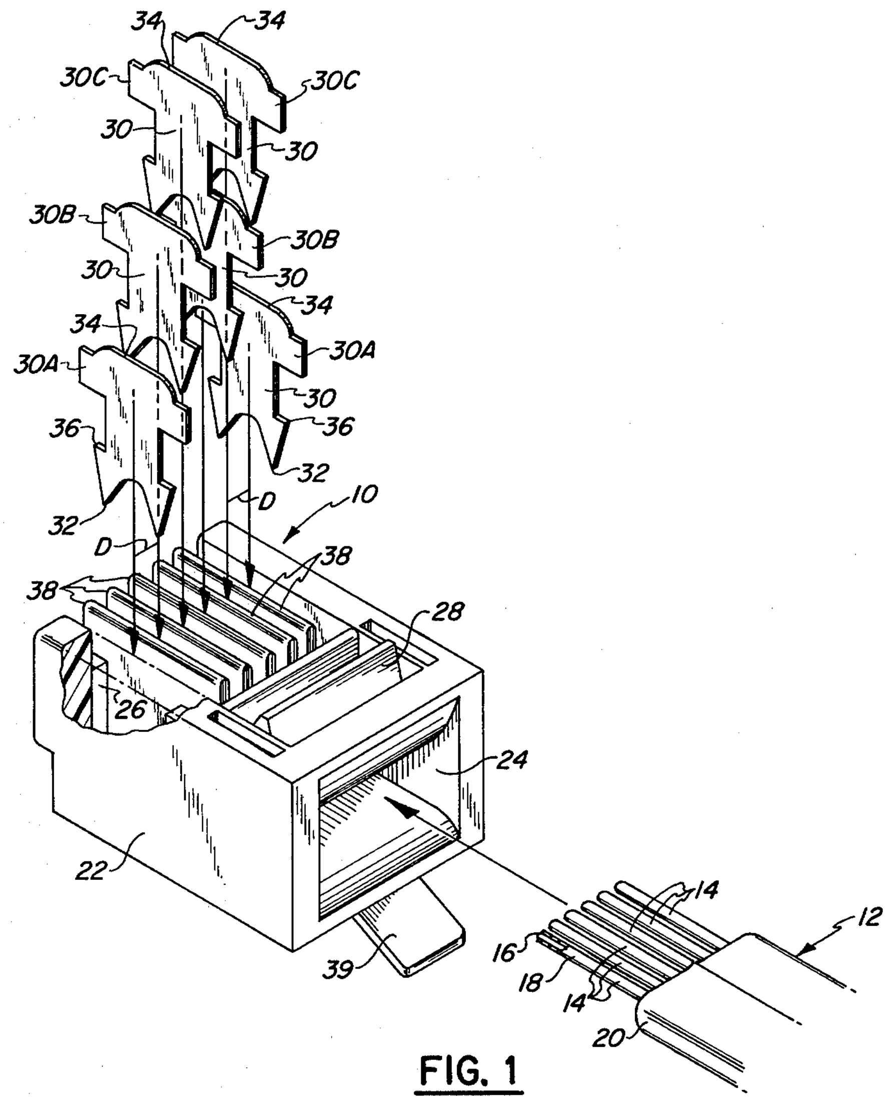
FIG. 1 is a pictorial perspective view illustrating the operations to be performed by the apparatus and method of the invention.

Referring now to the drawing, and especially to FIG. 1 thereof, a multi-contact electrical connector element is shown at 10 and is to be installed at the terminus of a multi-conductor cable 12. Cable 12 has a plurality of wires 14, each of which includes a conductor 16 and an insulating jacket 18, the wires 14 extending axially beyond an insulating sheath 20 which ordinarily envelops the wires 14 but which has been cut back to expose a given length of wires 14.

Connector element 10 includes a body member 22 constructed of a dielectric material, such as a thermoplastic synthetic resin material. Body member 22 has a throat 24 within which the terminus of cable 12 will be received to place the wires 14 beneath corresponding side-by-side slots 26 in the body member 22. Cable 12 will be secured within body member 22 by means of a tongue 28 which is integral with body member 22 and which will be deformed permanently into engagement with the cable 12 to clinch the cable 12 in place within the body member 22.

A plurality of electrical contacts 30, corresponding to the number of wires 14 and slots 26, then will be inserted into the slots 26. Contacts 30 are essentially flat and each includes pointed prongs 32 at one end, a contact face 34 at the other end, and barbs 36 between the ends of the contact. Upon insertion of a contact 30 into a slot 26, the prongs 32 of the contact will be driven through the insulating jacket 18 of a corresponding wire 14 to make an electrical connection with the conductor 16 of the wire. Barbs 36 will dig into the material of the body member 22 to stake the contact 30 within the body member 22, and contact face 34 will provide the desired electrical contact interface for connection to a complementary connector element (not shown). Inserted contacts 30 will be placed side-by-side in close proximity, in accordance with the spacing between wires 14 of cable 12, with adjacent contacts 30 spaced apart a relatively short lateral distance D, and contact faces 34 will be separated from one another by barriers 38. A latch 39 is provided on the body member 22 for locking the connector element 10 in place within the complementary connector element.

The illustration of connector element 10 in FIG. 1 is greatly enlarged. In reality, the connector element is very small and the lateral distance D between adjacent side-by-side installed contacts 30 is quite short. In order to enable the accomplishment of the above-described assembly operation with rapidity and accuracy, the present invention provides apparatus and method capable of dealing successfully with the small dimensions and high tolerances required by the operation.

Figure 2:
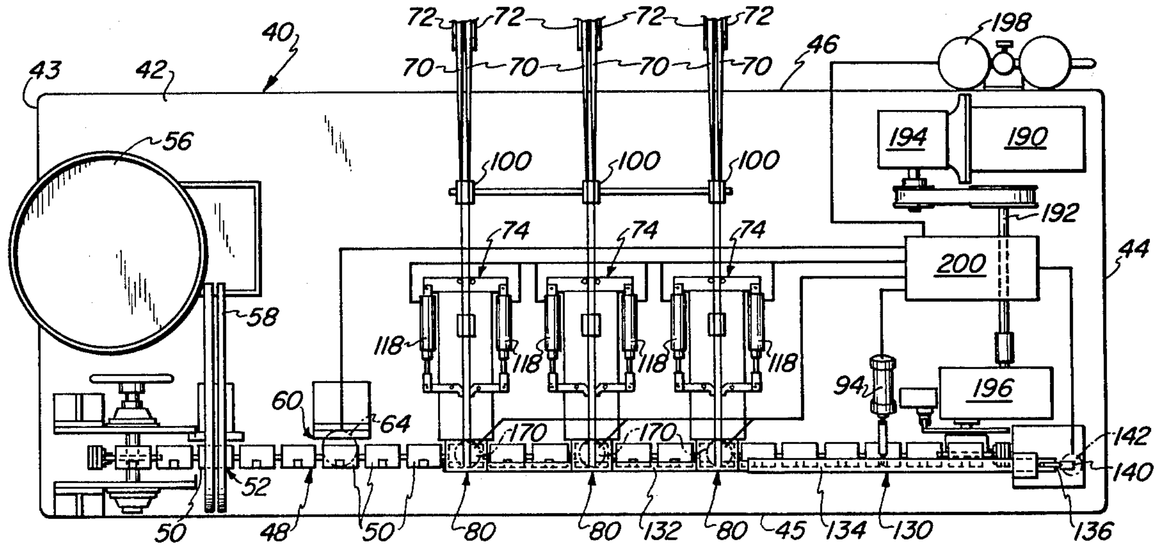
FIG. 2 is a plan view of an apparatus constructed in accordance with the invention.
Figure 3:
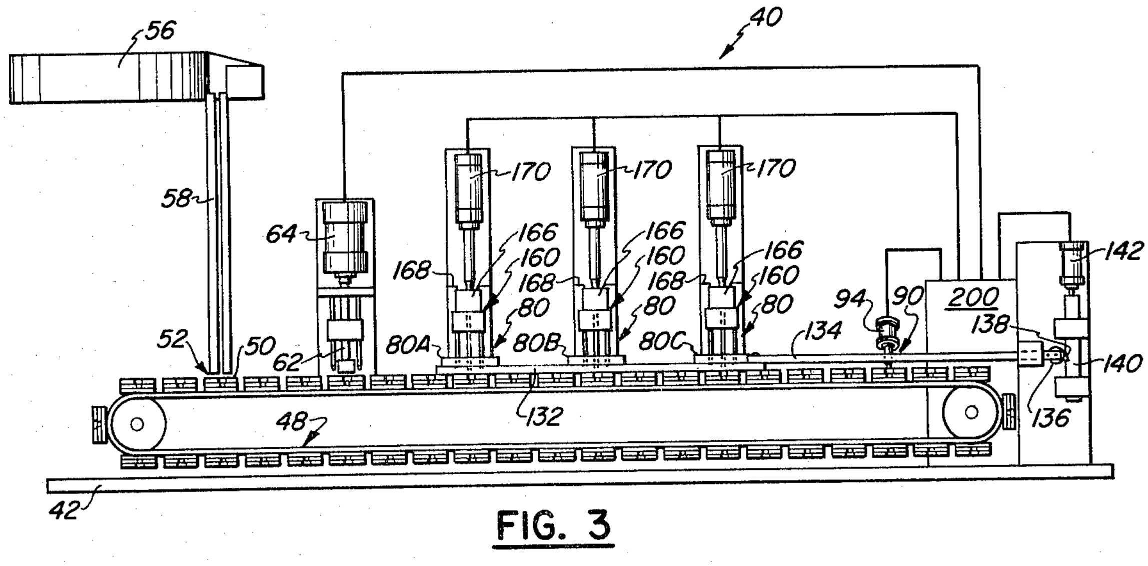
FIG. 3 is a front elevational view of the apparatus.
Figure 4:
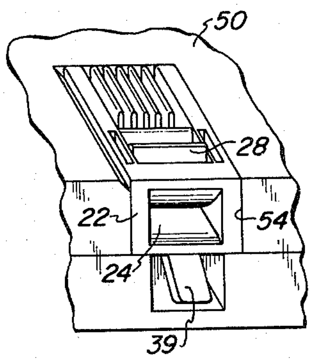
FIGS. 4 through 9 are pictorial perspective views illustrating various steps in a method of the invention performed at various stations in the apparatus.

Turning now to FIGS. 2 through 9, an apparatus constructed in accordance with the invention is illustrated generally at 40, in FIGS. 2 and 3, and performs a series of steps, in accordance with the method of the invention, as shown in FIGS. 4 through 9. Apparatus 40 has a frame 42 extending longitudinally from a first end 43 toward a second end 44. The front of the frame 42 is at 45 while the rear is at 46. Conveying and locating means in the form of a conveyor 48 transports and locates a plurality of nest members 50 along a path of travel which passes through a series of stations at which are performed the steps shown in FIGS. 4 through 9. Thus, at station 52 a nest member 50 receives a body member 22 of a connector element, the nest member 50 having a recess 54 within which the body member 22 is seated with the body member 22 oriented so that the throat 24 opens toward the front 45 of the frame 42, as seen in FIGS. 2 and 4. A supply of body members 22 is maintained in a hopper 56 and body members 22 are delivered serially and in proper orientation by a chute 58 which extends from the hopper 56 to the nest member 50 located at station 52.

Figure 5:
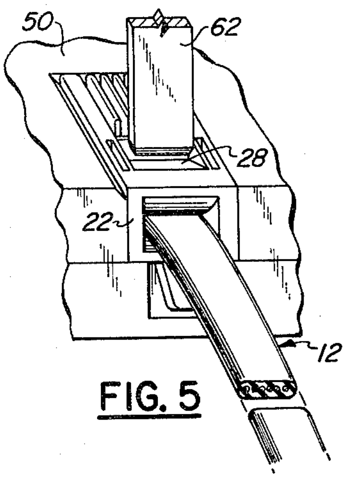
Figure 14:
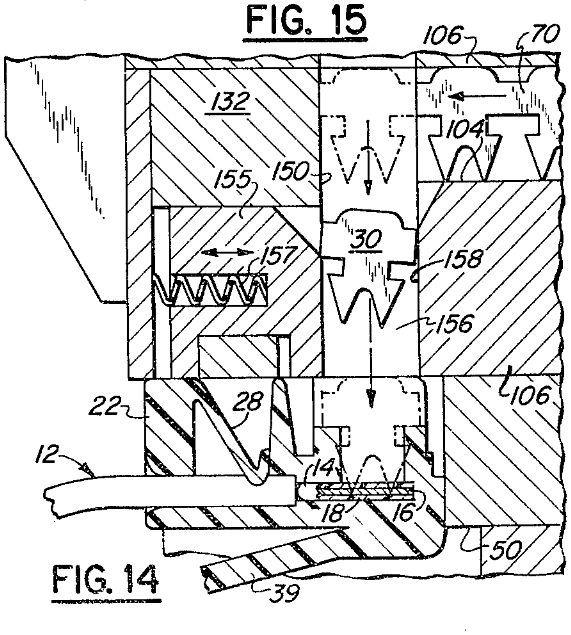
FIG. 14 is an enlarged fragmentary view of a portion of FIG. 12.
Figure 13:
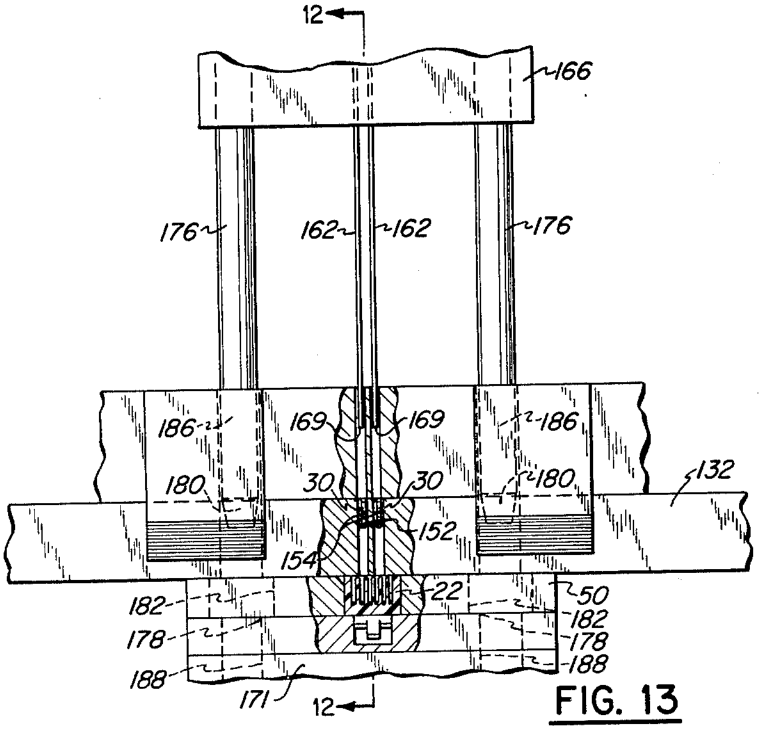
FIG. 13 is a fragmentary front elevational view, partially sectioned, of the portion of the apparatus shown in FIG. 12.

At the next station 60, an operator (not shown) who ordinarily would be at the front of the apparatus manually inserts the terminus of a cable 12 into the exposed throat 24 of the body member 22 located at that station. Upon actuation of apparatus 40 through a cycle of operation, a ram 62 is driven downwardly by an actuator, shown in the form of a pneumatic cylinder 64, to engage the tongue 28 of the body member 22 and permanently deform the tongue 28 downwardly to clinch the cable 12 in place in the body member 22, as seen in FIG. 5. (The clinched assembly also is shown in FIG. 14).

The nest member 50 then is transported to the next subsequent station to commence insertion of the contacts 30. In the illustrated example, the number of contacts 30 is six; however, it is to be understood that the number of contacts can be increased or decreased depending upon the number required in the connector element being assembled. The contacts 30 themselves are supplied in contact strips 70 of indeterminate length (see FIG. 12 for an enlarged elevational view of a contact strip 70), each contact strip 70 including a series of consecutive contacts 30 integral with one another along the length of the strip. Contact strips 70 are advanced from supply means shown in the form of reels 72 located at the rear 46 of frame 42, and feed means 74 are provided to advance the contact strips 70 toward the path of travel of the nest members 50 for the insertion operation. Prior to insertion, each contact 30 must be severed from a contact strip 70. The mechanisms for feeding and cutting the contact strips 70 and then inserting the contacts 30 will be described in detail below and will be seen to require an arrangement of component parts having finite dimensions, which arrangement and dimensions must be reconciled with the very small lateral spacing between adjacent inserted contacts. In an apparatus wherein only one contact at a time would be inserted into the body member of the connector element, the distance between the side-by-side adjacent inserted contacts would not necessarily be a limitation upon the dimensions of a feed means, a cutting means and an inserting means; however, the rate of production of assembled connector elements would be limited by the large number of repetitive operations required for the serial insertion of multiple contacts. On the other hand, while the insertion of more than one contact at a time would give rise to a concomitant increase in the production rate; the limitations placed upon the feed means, the cutting means and the insertion means by the close proximity of the side-by-side adjacent contacts militate against the simultaneous insertion of closely adjacent contacts.

The apparatus and method of the present invention provide a relatively high rate of production by enabling the serial insertion of groups of simultaneously inserted contacts, while enabling a practical arrangement and dimensioning of component parts by increasing the spacing between the contacts of each inserted group beyond the spacing required between the inserted contacts of a completed connector element. The desired result is accomplished by inserting the contacts sequentially in interlaced groups of simultaneously inserted contacts, thereby enabling the adjacent contacts of each group to be spaced apart a distance greater than the aforesaid required spacing and, upon completing the insertion of all of the groups, the required relatively short distance between adjacent inserted contacts will be attained with accuracy.

Figure 6:
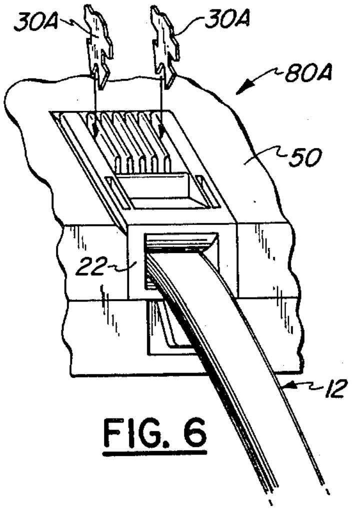
Figure 7:
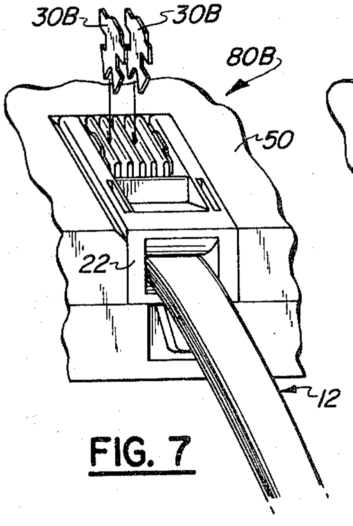
Figure 8:
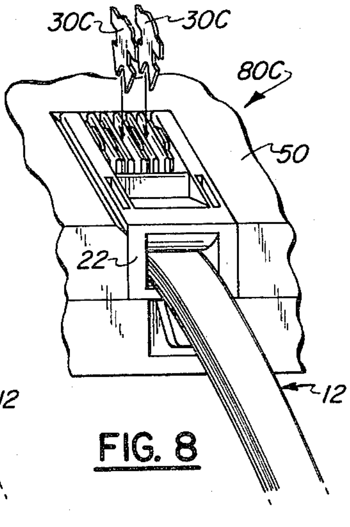
Figure 9:
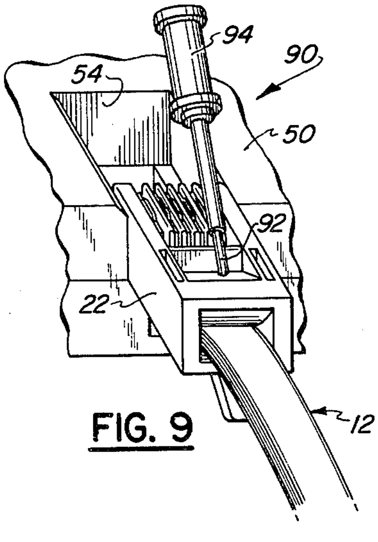

Thus, in the illustrated example wherein six closely spaced contacts 30 are to be inserted into body member 22 of connector element 10, three insertion stations 80 are provided along the path of travel of the nest members 50. A group of two contacts 30 is inserted at each station 80, the two contacts in each group being inserted simultaneously and being spaced apart at least twice the distance D required between the adjacent contacts of the completed assembly. At the first insertion station 80A, a group consisting of the two outermost contacts 30A are inserted, as seen in FIG. 6. The spacing between the outermost contacts 30A is five times the distance D. At the next insertion station 80B, another group consisting of contacts 30B are inserted, as seen in FIG. 7. The spacing between contacts 30B is twice the distance D. At the next station 80C, still another group consisting of contacts 30C are inserted, as seen in FIG. 8. The spacing between contacts 30C is twice the distance D. However, since the three groups of contacts 30A, 30B and 30C are interlaced, the distance between the adjacent installed six contacts is the distance D. Thus, apparatus 40 accomplishes the simultaneous insertion of multiple contacts without requiring the simultaneous insertion of contacts spaced apart only by the distance D. Upon completion of the insertion of all six contacts 30, the completed assembly is ejected at a subsequent station 90 by means of an ejector rod 92 which is actuated by a pneumatic cylinder 94 to engage the body member 22 and push the body member forward out of the recess 54 of the nest member 50, as seen in FIG. 9.

Figure 10:
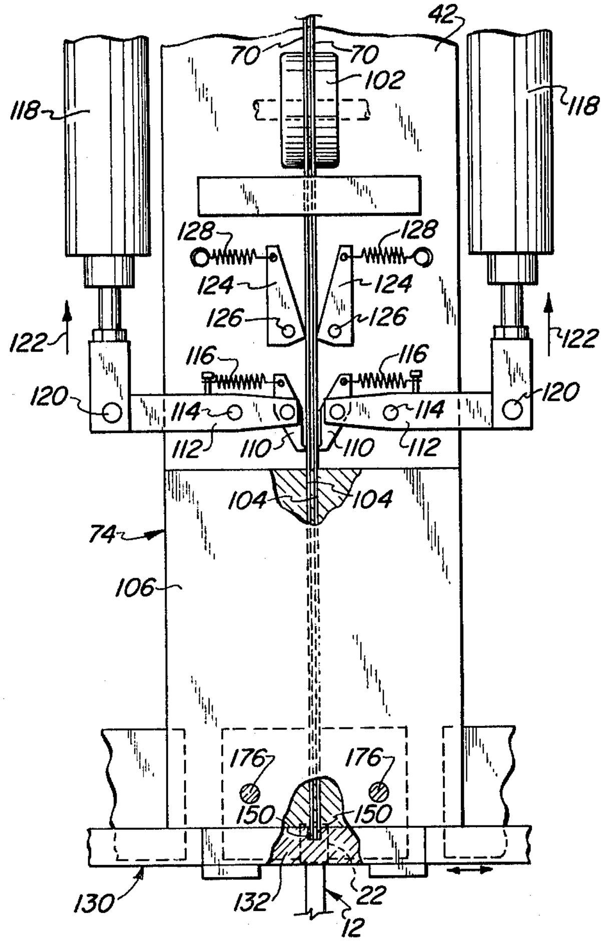
FIG. 10 is an enlarged, fragmentary plan view, partially sectioned, of a portion of the apparatus.

The construction and arrangement of each insertion station 80 is shown in greater detail in FIGS. 10 through 16. As seen in FIG. 10, feed means 74 advances a pair of contact strips 70 from the reels 72 at the rear 46 of frame 42 (see FIG. 2), the contact strips 70 passing from the reels 72 through a first roller guide 100 and then through a second roller guide 102 to enter guide passages 104 within a guide block 106. Each contact strip 70 is advanced from the rear 46 toward the front 45 of frame 42 in an incremental, step-by-step fashion by a feed pawl 110 carried by a feed lever 112. Feed pawl 110 is pivoted at 114 and is biased toward the corresponding contact strip 70 by a helical spring 116. An actuator in the form of a pneumatic cylinder 118 is coupled to feed lever 112 at 120 so that each stoke of the pneumatic cylinder 118 in the direction of arrow 122 will advance the contact strip 70 through one increment. A brake 124 is pivoted upon frame 42 at 126 and is urged against a corresponding contact strip 70 by a helical spring 128 to preclude retraction of the contact strip 70 upon retraction of the feed pawl 110.

Cutting means 130 is provided at the front 45 of frame 42 to sever the forwardmost contact 30 from each contact strip 70 and is seen to include a cutting bar 132 extending into each station 80. Returning for a moment to FIGS. 2 and 3, cutting bar 132 is shown affixed to an actuating rod 134 which normally is biased toward the right, as seen in FIGS. 2 and 3, into a retracted position. In that retracted position, a follower 136, which is carried at the right end of the actuating rod 134, is urged into a recessed portion 138 of an actuating slide 140 which is coupled to an actuator in the form of a pneumatic cylinder 142. Upon actuation of cylinder 142 to move slide 140 downwardly, follower 136 will be driven out of recessed portion 138 and rod 134 will be urged to the left, to an advance position. Advancement of the rod 134 to the left will move cutting bar 132 through a cutting stroke, as will now be explained.

Figure 11:
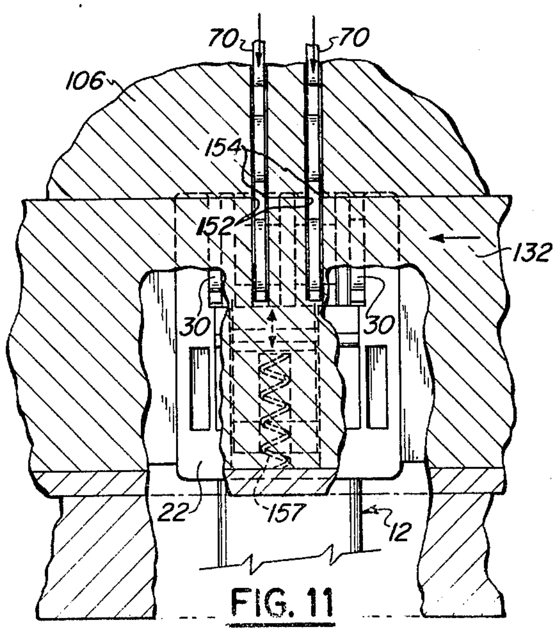
FIG. 11 is a further enlarged fragmentary plan view, partially sectioned, of a portion of FIG. 10.

As best seen in FIGS. 10, 11, 12, 13 and 14, each guide passage 104 is aligned with a slot 150 in the cutting bar 132 when the cutting bar 132 is in the retracted position. Advancement of each contact strip 70 through a single feed increment places the forwardmost contact 30 within a corresponding slot 150 in the cutting bar 132. Upon movement of the cutting bar 132 to the advanced position (to the left, as seen in FIGS. 10 and 11), the forwardmost contact 30 will be severed from the remainder of contact strip 70 by virtue of complementary cutting edges 152 and 154 located at the exit of guide passage 104 and the entrance of slot 150. It will be appreciated that in order to effect such a cutting action and enable the cutting action to be performed repeatedly and with a high degree of accuracy, the cutting edges 152 and 154 must be wear-resistant and must be supported with a rigid structure. These characteristics are attained by providing a sufficient lateral distance between the contact strips 70 in the vicinity of the cutting edges 152 and 154 so that space is available for enough backup structure to establish cutting elements having a prescribed lateral thickness for supplying the necessary rigidity. Thus, by enabling an increased lateral distance between the contacts 30 in each group of simultaneously severed contacts, apparatus is provided for successfully severing more than one contact at each insertion station 80 for the simultaneous insertion of a group of contacts as will be explained below.

Figure 12:
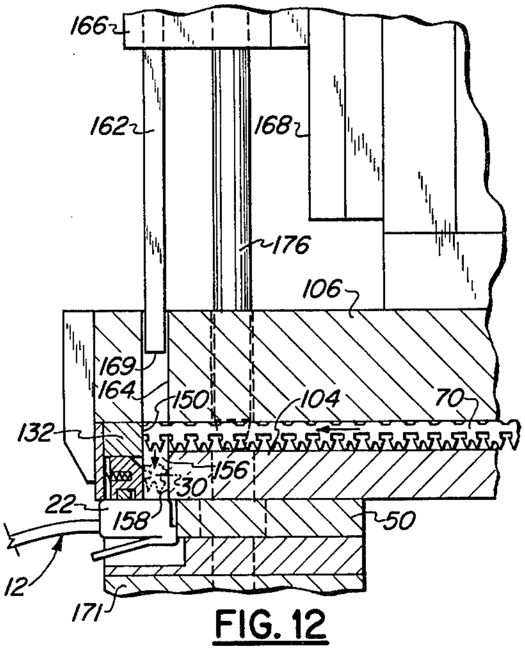
FIG. 12 is a cross-sectional view taken along line 12—12 of FIG. 13.

Once a contact 30 is severed from a contact strip 70, the severed contact will drop within the slot 150, as seen in phantom in FIG. 12 and in full lines in FIG. 14. A nest member 50 has been placed beneath cutting bar 132 so that body member 22 of contact element 10 is located with slots 26 thereof in register with the corresponding slots 150 in cutting bar 132. Cutting bar 132 is retained in the advanced position, by virtue of the retention of slide 140 in the downward position thereof, so that slots 150 remain in register with corresponding slots 26. A retaining means includes a stop bar 155 resiliently biased, by a spring 157, into the guide means established by contact channel 156 formed by slot 150 and the front wall of the guide block 106 at 158 (see FIGS. 12 and 14) so as to engage the dropped severed contact 30 with a slight frictional engagement and to retain the severed contact 30 in the dropped position and in proper alignment above the body member 22 in the nest 50, as shown in phantom in FIG. 12 and in full lines in FIG. 14.

Insertion means 160 is provided at each insertion station 80 and, as best seen in FIGS. 12, 13, 15 and 16, includes a plunger 162 received within a guide channel 164 located above the contact channel 156 established by slot 150 in the cutting bar 132. When the cutting bar 132 is in the advanced position and slots 150 are in register with corresponding slots 26 in the body member 22, the slots 150 also are aligned with corresponding guide channels 164.

Figure 15:
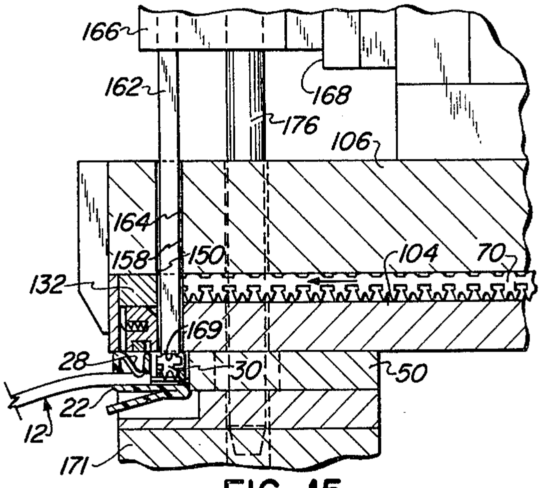
FIG. 15 is a cross-sectional view taken along line 15—15 of FIG. 16.
Figure 16:
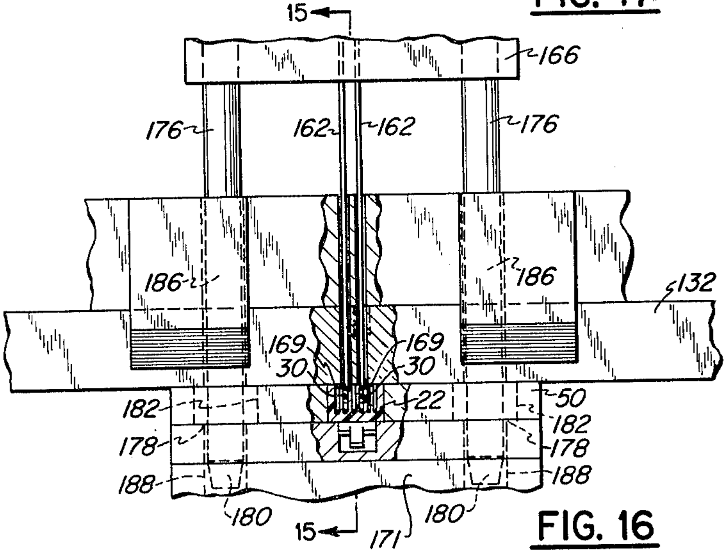
FIG. 16 is a fragmentary front elevational view of the portion of the apparatus shown in FIG. 15.

As seen in FIG. 3, the plungers 162 of each station 80 are carried by a slide block 166 which is guided for up and down reciprocating motion by vertical ways 168. An actuator in the form of a pneumatic cylinder 170 is coupled to each slide block 166 such that actuation of the cylinder 170 will move the slide block 166 downwardly. Downward movement of slide block 166 moves the plungers 162 downwardly through guide channel 164 and into contact channel 156 to engage the end face 169 of each plunger 162 with the severed contact 30 held in the corresponding contact channel 156. Continued downward movement of the plungers 162 will move the severed contacts 30 downwardly against the slight resistance established by the stop bars 155, which slight resistance aids in maintaining the necessary alignment of the severed contacts 30 with the end faces 169 of plungers 162, so that the severed contacts 30 are pushed, by continued downward movement of the plungers 162, into corresponding slots 26 in position to effect the desired insertion of the contacts 30 into the body member 22, as seen in FIGS. 15 and 16.

It is noted that the various movements described above must be carried out with precision to assure accuracy and the proper functioning of the apparatus. The movement of the contact strips 70 along longitudinal feed paths, together with the movement of the cutting bar 132 laterally relative to the feed paths to a positively fixed lateral offset position, and the vertical, or altitudinal, movement of the plungers 162 defined by the slide blocks 166 and ways 168 all contribute to accurately controlled movements for effecting precision repetitive operations.

Figure 17:
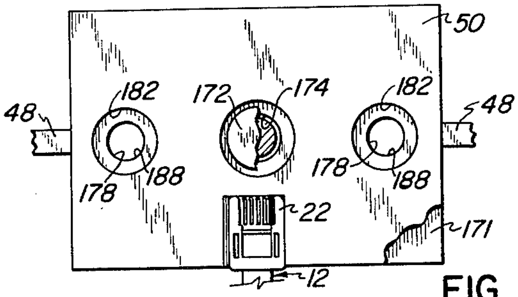
FIG. 17 is a plan view, partially sectioned, of a component part of the apparatus.

In order to assure the accurate location of each body member 22 within an insertion station 80, with the appropriate slots 26 of the body member 22 in proper registration with the contact channels 156, nest members 50 are mounted upon carriers 171 which are, in turn, affixed to conveyor 48. As seen in FIG. 17, each nest member 50 is coupled to a carrier 171 by means of a bolt 172 which is anchored securely in carrier 171, but which passes through an aperture 174 in nest member 50, which aperture 174 is large enough in diameter to provide enough clearance around bolt 172 to enable the nest member 50 to float slightly in lateral directions relative to carrier 171. Interengaging means are then provided for proper alignment as follows.

Each slide block 166 carries a pair of alignment pins 176 (also see FIG. 3), as well as plungers 162, and each nest member 50 includes a corresponding pair of alignment apertures 178. Pins 176 are tapered at their lower ends 180 and apertures 178 have a greater diameter at their upper openings 182. In addition, pins 176 project downwardly beyond the lower ends of the plungers 162. Upon downward movement of the slide blocks 166, to effect an insertion operation, pins 176 engage corresponding apertures 178, as seen in FIGS. 15 and 16, before plungers 162 are advanced into contact channels 156 and, by virtue of the close tolerances between the portions 186 of the pins 176 and portions 188 of the apertures 178, the floating nest member 50 is moved through slight lateral alignment movements to be positively located and held in appropriate alignment for the insertion of contacts 30.

Upon retraction of the slide blocks 166, pins 176 are retracted from apertures 178, and plungers 162 are retracted from slots 150 in the cutting bar 132. The cutting bar 132 is then retracted to its normal retracted position and the conveyor 48 is actuated to advance the nest members 50. The feed means 74 is actuated to advance each contact strip 70 through another increment and the entire insertion cycle can be repeated.

Returning to FIG. 1, timing of the sequence of operations of apparatus 40 is accomplished as follows. A drive motor 190 operates continuously and is coupled to a timing drive shaft 192 through a gear drive and clutch mechanism 194. Shaft 192 is coupled further to conveyor 48 through conveyor indexing drive 196. A main supply 198 furnishes air under pressure to a timing means 200 which is responsive to the rotation of shaft 192 to distribute air, under pressure, to the pneumatic cylinders 64, 94, 118, 142 and 170 in accordance with the angular position of shaft 192 during a cycle of operation of apparatus 40. Thus, for each cycle of operation, the clutch of mechanism 194 is engaged to rotate the shaft 192 and thereby effect actuation of the conveyor 48, the clinching ram 62, the feed means 74, the cutting means 130, the insertion means 160 and the ejector rod 92, all in the sequence described above.

It will be apparent that the method of the invention facilitates the installation of a relatively small multi-contact electrical connector element at the terminus of a multi-conductor cable and enables an increased production rate by enabling the contacts to be handled and inserted in groups within an apparatus constructed with precision for effective and reliable operation. Furthermore, the apparatus has a relatively simple and straightforward design in which the component parts are manufactured economically and are easily assembled to reduce the cost of purchasing and maintaining the apparatus. In addition, the apparatus is flexible in operation in that the several insertion stations may be changed in number or rearranged readily to accommodate electrical connector elements having a different number of contacts.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for installing a multi-contact electrical connector element at the terminus of an electrical cable having a plurality of insulated conductors, the connector including a dielectric body member carrying a plurality of electrical contacts arranged generally side-by-side and spaced laterally a given distance from one another, in accordance with the spacing between the conductors of the cable, with each contact secured within a slot in the body member and connected to a corresponding conductor, the apparatus comprising:

a frame;

a nest member for receiving and holding the body member in position to receive the conductors of the cable at laterally spaced positions corresponding to the side-by-side arrangement of the contacts;

locating means for locating the nest member at a predetermined insertion station along the frame;

supply means for supplying a group of said contacts to the predetermined insertion station, said contacts being in the form of contact strips of indeterminate length, one strip for each contact in the group, each strip including a series of consecutive contacts integral with one another along the length of the strip;

feed means for advancing the strips along feed paths of travel from the supply means toward the predetermined insertion station to juxtapose a group of contacts with the nest member at the station with the contacts of the group spaced apart laterally from one another a distance greater than said given distance;

cutting means at said predetermined insertion station in position for receiving said group of contacts, while the contacts remain integral with the strips, said cutting means being movable laterally relative to the strips to sever the group of contacts from the strips and move the severed contacts into alignment with the positions of the corresponding slots in the body member;

insertion means at said predetermined insertion station for moving the severed contacts along insertion paths of travel toward the nest member and into a corresponding slot in the body member to secure the contacts in the body member and make an electrical connection between each contact and a corresponding conductor; and further means for installing at least one further contact interlaced with the group of inserted contacts such that the spacing between the further contact and an adjacent inserted contact will equal said given distance.

2. The invention of claim 1 wherein the further means is located at a further insertion station and includes further supply means, further feed means, further cutting means and further insertion means, each duplicating essentially the corresponding supply means, feed means, cutting means and insertion means of said predetermined insertion station, for installing a further group of contacts interlaced with the first said group of contacts.

3. The invention of claim 2 wherein the predetermined insertion station and the further insertion station are spaced apart on the frame, and the apparatus includes conveying means for transporting the nest member from the predetermined insertion station to the further insertion station.

4. The invention of claim 3 wherein the apparatus includes:

a plurality of nest members; and a plurality of insertion stations; and the conveying means advances the nest members from one insertion station to another insertion station whereby the plurality of contacts are inserted into the body member, one group at a time, at successive insertion stations, in laterally interlaced arrangement.

5. The invention of claims 1, 2, 3 or 4 wherein the feed paths are oriented longitudinally and the insertion paths are oriented altitudinally relative to the lateral movement of the cutting means.

6. The invention of claim 5 including:

guide means for guiding the severed group of contacts along the insertion path; and retaining means resiliently biased into the guide means for retaining the severed contacts in alignment within the guide means.

7. The invention of claim 5 wherein the number of contacts is as least four and the number of contacts in each group is at least two, the contacts of each group being spaced apart from one another a distance at least twice as great as the given distance.

8. The invention of claim 1, 2, 3 or 4 wherein:

the feed means of at least the predetermined insertion station juxtaposes the group of contacts with the nest member, but offset laterally from the positions of the corresponding slots in the body member; and the cutting means of that station simultaneously severs the group of contacts from the strips and moves the severed contacts laterally into alignment with the positions of the corresponding slots in the body member.

9. The invention of claim 8 wherein the feed paths are oriented longitudinally and the insertion paths are oriented altitudinally relative to the lateral movement of the cutting means.

10. The invention of claim 9 including:

guide means for guiding the severed group of contacts along the insertion path; and retaining means resiliently biased into the guide means for retaining the severed contacts in alignment within the guide means.

11. The invention of claim 9 wherein the number of contacts is at least four and the number of contacts in each group is at least two, the contacts of each group being spaced apart from one another a distance twice as great as the given distance.

12. The invention of claim 11 wherein the cutting means includes:

a cutting bar having a pair of slots therein, the slots being spaced apart laterally a distance equal to the lateral spacing between the two contacts of the group;

cutting actuating means for moving the cutting bar between a first position wherein the slots are aligned with the feed paths of travel to receive the two contacts as the strips are advanced, and a second position wherein the slots are aligned with the insertion paths of travel; and cutting elements having a prescribed lateral thickness and including cutting edges arranged to sever the two contacts from the corresponding strips as the actuating means moves the cutting bar from the first position to the second position.

13. The invention of claim 12 wherein the lateral spacing between the two contacts of the group is at least twice the given distance to provide the cutting elements with sufficient prescribed lateral thickness.

14. The invention of claim 13 wherein the insertion means includes:

a pair of plungers spaced apart laterally a distance equal to the lateral spacing between the two contacts of the group and aligned altitudinally with the slots in the body member corresponding to the two contacts to be inserted; and insertion actuating means for moving the plungers altitudinally between a first position wherein the plungers are retracted from the slots of the cutting bar and a second position wherein the plungers extend through the slots toward the nest member; and the apparatus includes timing means for effecting actuation of the insertion actuating means for moving the plungers from the first position to the second position subsequent to effecting actuation of the cutting actuating means to move the cutting bar from the first position to the second position thereof, and while the cutting bar is in the second position.

15. The invention of claim 14 including:

guide means for guiding the severed group of contacts along the insertion path; and retaining means resiliently biased into the guide means for retaining the severed contacts in alignment within the guide means.

16. The invention of claim 14 wherein the nest member includes at least a portion movable laterally through limited alignment movements, said portion carrying the body member, the apparatus including alignment means for aligning the nest member portion relative to the insertion means prior to the insertion means moving the severed contacts into the slots of the body member, the alignment means having interengaging means carried by the nest member portion and the insertion actuating means, the interengaging means being arranged to engage prior to the insertion engagement of the plungers with the contacts so as to move the nest member portion laterally through a limited alignment movement to align positively the nest member portion appropriately relative to the plungers prior to insertion of the contacts.

17. The invention of claim 16 wherein the interengaging means includes at least one aperture in the nest member portion and a complementary pin movable by the insertion actuating means into the aperture for alignment of the aperture with the pin and concommitant alignment of the nest member portion.

18. The invention of claims 1, 2, 3 or 4 wherein the nest member includes at least a portion movable laterally through limited alignment movements, said portion carrying the body member, the apparatus including alignment means for aligning the nest member portion relative to the insertion means prior to the insertion means moving the severed contacts into the slots of the body member.

19. The invention of claim 18 wherein the alignment means includes interengaging means carried by the nest member portion and insertion means, the interengaging means being arranged to engage, prior to the movement of the severed contacts by the insertion means into a corresponding slot in the body member, so as to move the nest member portion laterally through a limited alignment movement to align positively the nest member portion appropriately relative to the insertion means prior to insertion of the contacts.

20. The invention of claim 19 wherein the interengaging means includes at least one aperture in the nest member portion and a complementary pin movable by the insertion means into the aperture for alignment of the aperture with the pin and concomitant alignment of the nest member portion.

21. The invention of claim 20 wherein the feed paths are oriented longitudinally and the insertion paths are oriented altitudinally relative to the lateral movement of the cutting means.

22. The invention of claim 21 including:

guide means for guiding the severed group of contacts along the insertion path; and retaining means resiliently biased into the guide means for retaining the severed contacts in alignment within the guide means.

23. The invention of claim 21 wherein the number of contacts is at least four and the number of contacts in each group is at least two, the contacts of each group being spaced apart from one another a distance twice as great as the given distance.

24. A method for installing a multi-contact electrical connector element at the terminus of an electrical cable having a plurality of insulated conductors, the connector including a dielectric body member carrying a plurality of electrical contacts arranged generally side-by-side and spaced laterally a given distance from one another, in accordance with the spacing between the conductors of the cable, with each contact secured within a slot in the body member and connected to a corresponding conductor, the method comprising the steps of:

receiving and holding the body member within a nest member in position to receive the conductors of the cable at laterally spaced positions corresponding to the side-by-side arrangement of the contacts;

locating the nest member at a predetermined insertion station;

supplying a group of said contacts to the predetermined insertion station, said contacts being in the form of contact strips of indeterminate length, one strip for each contact in the group, each strip including a series of consecutive contacts integral with one another along the length of the strip;

advancing the strips along feed paths of travel from the supply means toward the predetermined insertion station to juxtapose a group of contacts with the body member at the station with the contacts of the group spaced apart laterally from one another a distance greater than said given distance;

receiving said group of contacts at the predetermined insertion station, while the contacts remain integral with the strips, severing the group of contacts from the strips and moving the severed contacts into alignment with the positions of the corresponding slots in the body member;

moving the severed contacts along insertion paths of travel toward the body member and into a corresponding slot in the body member to secure the contacts in the body member and make an electrical connection between each contact and a corresponding conductor;

transporting the nest member, with the body member therein, to a further insertion station; and installing, at the further insertion station, at least one further contact interlaced with the group of inserted contacts such that the spacing between the further contact and an adjacent inserted contact will equal said given distance.

25. The invention of claim 24 wherein the step of installing at least one further contact includes installing a further group of contacts interlaced with the first said group of contacts.

26. The invention of claim 24 or 25 including positively aligning the body member with the group of severed contacts prior to insertion of the severed contacts into the corresponding slots.

27. In a method of installing a plurality of electrical contacts in a dielectric body member of a multi-contact electrical connector wherein adjacent installed contacts are spaced apart a relatively short given distance, the improvement comprising:

receiving and holding the body member within a nest member in position to receive the conductors of the cable at laterally spaced positions corresponding to the side-by-side arrangement of the contacts;

securing the body member to the cable while the body member is held in the nest member; and inserting the contacts in sequential interlaced groups of simultaneously inserted contacts, with the adjacent contacts of each group spaced apart a distance greater than said given distance during installation, whereby, upon completion of the installation of all of said groups, the spacing between adjacent installed contacts will be the relatively short given distance.

28. The invention of claim 27 wherein the groups each include two contacts.

29. In an apparatus for installing a plurality of electrical contacts in a dielectric body member of a multi-contact electrical connector wherein adjacent installed contacts are spaced apart a relatively short given distance, the improvement comprising:

means for receiving and holding the body member within a nest member in position to receive the conductors of the cable at laterally spaced positions corresponding to the side-by-side arrangement of the contacts;

means for securing the body member to the cable while the body member is held in the nest member; and means for inserting the contacts in sequential interlaced groups of simultaneously inserted contacts, with the adjacent contacts of each group spaced apart a distance greater than said given distance during installation, whereby, upon completion of the installation of all of said groups, the spacing between adjacent installed contacts will be the relatively short given distance.

30. The invention of claim 29 wherein the groups each include two contacts.

* * * * *